J. BOGER.
Distance Instrument.

No. 218,222. Patented Aug. 5, 1879.

WITNESSES:
W. W. Hollingsworth
Edw. W. Byrn

INVENTOR
John Boger
BY
ATTORNEYS.

UNITED STATES PATENT OFFICE.

JOHN BOGER, OF POWHATAN POINT, OHIO.

IMPROVEMENT IN DISTANCE-INSTRUMENTS.

Specification forming part of Letters Patent No. 218,222, dated August 5, 1879; application filed January 20, 1879.

*To all whom it may concern:*

Be it known that I, JOHN BOGER, of Powhatan Point, in the county of Belmont and State of Ohio, have invented a new and Improved Instrument for Measuring and Indicating Distances; and I do hereby declare that the following is a full, clear, and exact description of the same, reference being had to the accompanying drawings, forming part of this specification, in which—

Figure 1:
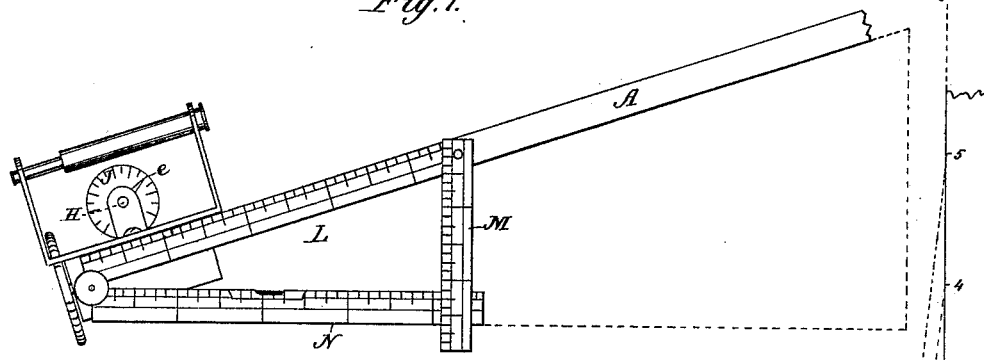
Figure 3:
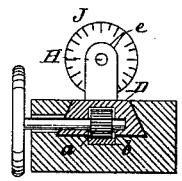
Figure 2:
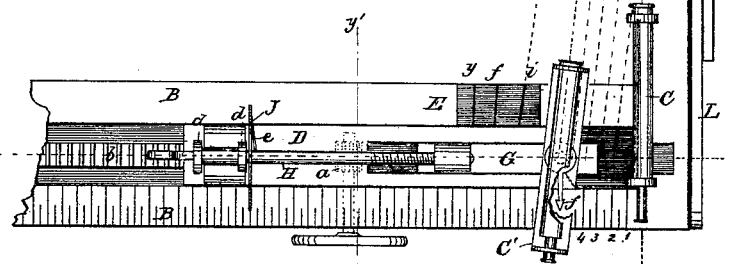

Figure 1 is an end elevation. Fig. 2 is a plan view. Fig. 3 is a section through the line $y'$ $y'$ of Fig. 2.

My invention relates to an improved instrument for measuring the distance of a remote object.

The invention is based upon the general principle of the employment of two right-angular bars, one of which is provided with a sighting-glass, and is directed toward the object, and the other of which bars is graduated, and is provided with another sighting-instrument, which, when adjusted to a certain position upon the bar and turned to the object, indicates by the angle at such position the distance of the object, the said distances which the different angles and positions together indicated being previously determined by careful measurement.

My invention consists in arranging the integrally-adjustable sighting-instrument upon a pivot or swivel in connection with a scale of incline lines, so that when turned to one inclination, as measured by said scale, the integral lateral adjustment in equal spaces indicate on the line to be measured equal spaces of one unit of measurement, and when the instrument is turned to another inclination, as indicated by the scale, equal spaces of the lateral adjustment of the sighting-instrument indicate equal distances on the line to be measured of another unit of measurement.

The invention also consists in the means for determining the fractional portions of the units of measurement, as hereinafter more fully described.

In the drawings, A B, Fig. 2, represent two bars, connected at right angles to each other, and of which A carries a stationary sighting-instrument, C, and is arranged to be in line with the object to be measured, while B carries the movable sighting-instrument C', and is at right angles to said line. This movable sighting-instrument is sustained upon a sliding frame, D, which moves in a longitudinal slot or recess in the bar B, and is adjusted by a pinion, $a$, and a rack, $b$, the said pinion being arranged in the lower portion upon a shaft that projects through a slot in the side of the bar B and terminates in a hand-wheel, while the rack is a fixture in the bottom of the bar B. These means permit the sighting-instrument C' to be adjusted throughout the entire length of the bar B. This movable glass C' is pivoted centrally to its carriage, so that it may be made to maintain different angles to the line of the permanent sight. These angles are marked upon a scale on the plate E, and they give the units of measure on the object-line for equal spaces of the adjustment of the carriage or frame on the arm B. Thus the arm B being laid off into equal graduations, when the movable sighting-glass is parallel with the line marked $i$ on the scale E the unit of measure will be inches, and every space of the graduated bar B to which the glass C' may be adjusted will cause said glass to strike the object-line $x$ $x$ $x$ an inch farther along than the preceding space. The next line on the scale E (marked $f$) will indicate feet as the unit of measure, (its angle to the object-line being less,) and the movement of the carriage over every space on the arm B will then indicate feet on the object-line, and so on for the other lines, $y$, &c. As the units of measure get larger, it will be seen that the movable sighting-instrument becomes more and more parallel with the object-line or stationary sighting-instrument.

Now, in determining the distance of the remote object, the stationary glass C is first sighted at the object, and this position gives the object-line. The movable glass C' is then adjusted for the units of measure, which, in order to come within the limit of our drawings, we will suppose to be inches. To do this, its inclination is brought to be the same as the line $i$ on the scale E, which gives inches as the unit of measure. The movable glass is next adjusted laterally and bodily by the rack and pinion until the object can be sighted through the same at its given inclination. The number of spaces then counted on the arm B from the object-line to its measuring position indicate at once in inches the distance of the remote object from the stationary sighting-instrument, because when the movable instrument is set at the inclination given the said spaces represent inches in the object-line as measured by parallel lines extending from the spaces on the arm B to the points an inch apart on the object-line. For measuring in feet or yards the glass is made to correspond to lines $f$ or $y$.

As the movable glass when brought to bear on the object may not register exactly with one of the graduated marks, but may come between the same, I have provided a means for indicating the fractional part of the unit of measure. For this purpose the movable glass C′ is pivoted in its general carrier to a supplemental slide, G, located in a groove in said carrier, and this supplemental slide I adjust in its carrier by a screw-shaft, H, which passes through an extension from said slide, the said shaft being held in bearings in the carriage by collars $d\ d$. Around this shaft is fixed stationarily a dial-plate, J, divided into fractional parts of the unit of measure, and upon the shaft is an index-hand, $e$. Now, if the measurement should come between two spaces on the arm B, the shaft is turned until the carrier moves its index-hand $f$ back to the last mark, and the fractional part that runs over the even measure is indicated by the hand $e$ of the screw-shaft on the dial-plate.

By employing a set of triangular bars, L M N, with my instrument, as arranged in Fig. 1, I am enabled to readily measure the height of a hill; but as I do not here make any claim to these devices they need not be particularly described.

Having thus described my invention, what I claim as new is—

1. The instrument for measuring distances consisting of a bar, A, provided with a sighting-instrument and a graduated bar, B, having a plate, E, laid off for different units of measure, and provided with a sliding frame carrying a sighting-instrument, connected to the same by a vertical pivot or swivel, for the adjustment of said instrument to different units of measure and different distances as measured by said units, as described.

2. The combination, with the sliding carrier having a dial-plate, J, of the screw-shaft H, having pointer $e$, and a supplemental slide, G, carrying the movable sighting-instrument, all combined as shown and described, for the purpose of indicating the fractional parts of the adopted unit of measurement.

The above specification of my invention signed by me this 10th day of January, 1879.

JOHN BOGER.

Witnesses:
 EDWD. W. BYRN,
 SOLON C. KEMON.